(No Model.)
E. C. VOM HOFE.
SNELL.
No. 396,246. Patented Jan. 15, 1889.
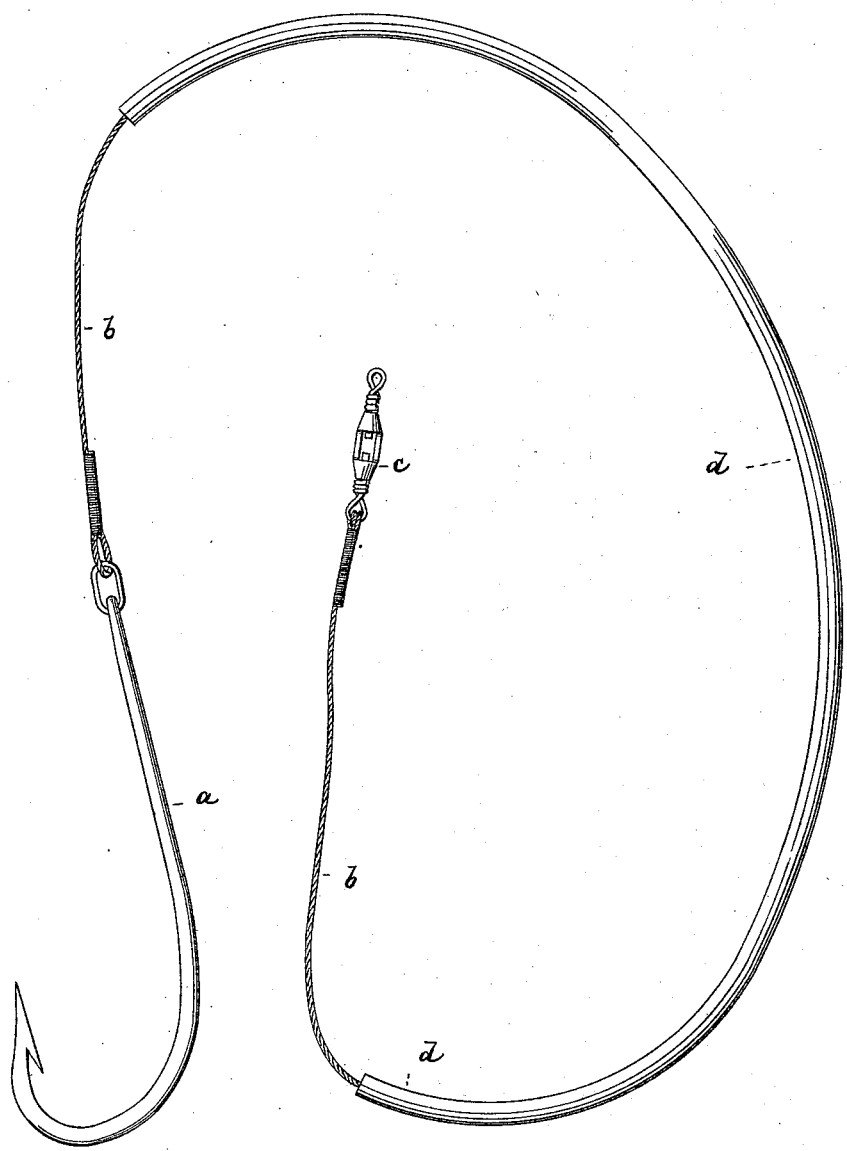

UNITED STATES PATENT OFFICE.

EDWARD CHARLES VOM HOFE, OF BROOKLYN, NEW YORK.

SNELL.

SPECIFICATION forming part of Letters Patent No. 396,246, dated January 15, 1889.

Application filed November 20, 1888. Serial No. 291,323. (No model.)

*To all whom it may concern:*

Be it known that I, EDWARD CHARLES VOM HOFE, of Brooklyn, Kings county, New York, have invented an Improved Fishing-Snell, of which the following is a specification.

This invention relates to a fishing-snell more particularly designed for catching the tarpon. These fish frequently hang upon the hook for several hours and they are very apt to cut the snell by the grinding action of their jaws. The improved snell is constructed with a view to prevent such cutting, while it does permit the line to be cut by a shark, which is desirable, so that the shark carries off the hook alone.

A tarpon has perfectly hard jaws, that exert a grinding action something like sandpaper. To catch a tarpon, he must first swallow the hook, so that it engages his neck or throat, the jaws being so hard that the hook will not hold in them. Thus the jaws of a tarpon hanging upon a line act upon the snell from eight to fourteen inches from the hook. A shark is not a game fish, and sportsmen do not desire to catch him. If they do chance to catch a small one, they generally put a bullet through him and throw him overboard. Moreover, a shark, if of any size, is perhaps as strong as a horse, so that there is not the slightest chance of hauling him in. On the contrary, if he hangs to a hook he will readily carry away line, reel, and all, if the line is not quickly cut loose. This involves a serious loss to a sportsman, and may put an end to his fishing. So it is desirable that the hook alone is sacrificed. A shark bites through the snell from four to six inches from the hook. If, therefore, the snell is adapted to be cut near the hook and is prevented from being cut farther away from the hook, it is evident that the line is in proper condition for liberating a shark, but for hauling in a tarpon.

The invention consists in the various features of improvement more fully pointed out in the claims.

The accompanying drawing illustrates a side elevation of my improved snell.

The letter $a$ represents a fish-hook, to which there is attached a line, $b$, carrying at its other end a swivel or other device, $c$, by which it is connected to the fishing-line. Around the line $b$ there is placed a piece of rubber tubing, $d$, that fits the line sufficiently tight to be retained in position upon the line by friction when the tube is not under tension. The tube $d$ is shorter than the line $b$, and is preferably placed around line $b$ at some distance from the hook, so that a section of line $b$ is exposed between the end of the hook and the beginning of the tube, as shown. When the tube is grasped by a tarpon, as hereinafter described, it will, under the influence of his pull, be drawn down over the exposed end of the line and up to the upper end of the hook.

The jaws of a shark close upon the snell nearer to the hook than do those of a tarpon. A shark would therefore bite through the exposed end of the line $b$ and carry off the hook alone. A tarpon, however, would close over the rubber tube $d$, which he cannot sever. Under the severe strain from the tarpon the tube $d$ would slip upon the line, and thus unsteady his grip. When slipped close up to the hook, the tube $d$ would wrinkle under the jaws of the tarpon, and upon a momentary release it would slip up again. Thus that part of the tube $d$ which is under the action of the tarpon jaws would change, and thus no one part of the tube would have to stand all the attack.

I claim as my invention—

1. As a new article of manufacture, a fishing-snell composed of a line, $b$, and a surrounding rubber tube, $d$, substantially as specified.

2. The combination of hook $a$ and line $b$, with a flexible tube, $d$, surrounding said line and held thereon by frictional contact, the tube being adapted to slip upon the line under tension, substantially as specified.

3. The combination of hook $a$ and line $b$, with tube $d$ shorter than such line, a part of line $b$ being exposed between hook and tube, substantially as specified.

EDWARD CHARLES VOM HOFE.

Witnesses:
HENRY V. ROEDER,
F. V. BRIESEN.